(12) United States Patent
Turner

(10) Patent No.: US 9,777,829 B2
(45) Date of Patent: Oct. 3, 2017

(54) TRANSMISSION CONTROL DEVICE

(71) Applicant: Powertrain Control Solutions, LLC, Ashland, VA (US)

(72) Inventor: Charles R. Turner, Montpelier, VA (US)

(73) Assignee: Powertrain Control Solutions, LLC, Ashland, VA (US)

( * ) Notice: Subject to any disclaimer, the term of this patent is extended or adjusted under 35 U.S.C. 154(b) by 0 days.

(21) Appl. No.: 14/609,560

(22) Filed: Jan. 30, 2015

(65) Prior Publication Data

US 2015/0219209 A1    Aug. 6, 2015

Related U.S. Application Data

(60) Provisional application No. 61/934,098, filed on Jan. 31, 2014.

(51) Int. Cl.
| | |
|---|---|
| *F16H 61/02* | (2006.01) |
| *F16H 59/02* | (2006.01) |
| *F16H 61/16* | (2006.01) |
| *F16H 61/20* | (2006.01) |

(52) U.S. Cl.
CPC ......... *F16H 61/0206* (2013.01); *F16H 59/02* (2013.01); *F16H 61/0272* (2013.01); *F16H 61/16* (2013.01); *F16H 2061/165* (2013.01); *F16H 2061/207* (2013.01); *F16H 2312/09* (2013.01); *F16H 2312/10* (2013.01); *Y10T 74/20024* (2015.01)

(58) Field of Classification Search
None
See application file for complete search history.

(56) References Cited

U.S. PATENT DOCUMENTS

| | | | | |
|---|---|---|---|---|
| 4,425,620 | A * | 1/1984 | Batcheller | F16H 59/02 192/3.28 |
| 5,129,274 | A * | 7/1992 | Vukovich | F16H 61/0286 477/126 |
| 5,233,525 | A * | 8/1993 | Overmann | F16H 59/02 477/123 |
| 6,325,742 | B1 * | 12/2001 | Lee | F16H 61/0437 477/116 |
| 2003/0236121 | A1 * | 12/2003 | Byers | A63H 17/26 463/62 |
| 2011/0313627 | A1 * | 12/2011 | Ishikawa | F16H 61/16 701/51 |
| 2014/0024494 | A1 * | 1/2014 | Inoue | B60W 10/11 477/94 |

* cited by examiner

*Primary Examiner* — Ramya Burgess
*Assistant Examiner* — Timothy M Hannon
(74) *Attorney, Agent, or Firm* — John H. Thomas, P.C.

(57) ABSTRACT

An enhanced control system for an electronic automatic transmission enables the transmission to operate in a full neutral idle, a reverse lock-out, and an inching mode. These functions improve the mileage and durability of the operation of the transmission. They also enable the inching mode for use especially in industrial applications.

8 Claims, 9 Drawing Sheets

TRANSMISSION CONTROL DEVICE

This application claims the benefit of U.S. Provisional Application No. 61/934,098, filed Jan. 31, 2014, which is incorporated by reference herein in its entirety.

The present invention relates to the field of electronic automatic vehicle transmissions, and specifically to the electronic control of hydraulic automatic transmissions in order to obtain reverse lock-out, neutral idle, and inching mode functionality.

BACKGROUND

There are numerous types of transmissions being used in vehicles worldwide. These transmissions and their related control devices are significant drive train components that determine the fuel efficiency of the respective vehicles. Furthermore, the specific controls for each transmission also dictate the specific functionality of that transmission.

One type of widely-used transmission is a four-speed, hydraulic automatic transmission controlled by a manual shift lever. This four-speed transmission is typically a four gear transmission actuated by two electric shift solenoids. Examples of these common transmissions include the GM 4L60E and Ford 4R70 types of transmissions. These transmissions specifically, and these types of transmissions generally, were engineered for passenger and small-duty use and have some limitations in modern use. For example, one problem with these types of transmissions is that the transmission will remain engaged in either forward or reverse while idling. There is also the possibility of a driver switching the transmission from forward or neutral to reverse when the vehicle is moving forward. This may result in damage to the transmission. At the very least, it is not healthy for the durability of that transmission to switch from forward motion straight into reverse.

Additionally, there are many industrial uses for these specific types of electronic automatic transmissions. For some industrial uses such as service vehicles at airports, an operator of the service vehicle must frequently get in and out of the vehicle to line up the vehicle with hitches for various luggage trailers or other trailers. This creates a substantial waste of time and, as a result, the users may attempt to guess where a trailer is and back into it and damage it accidentally.

SUMMARY

It is an object of the present invention to overcome the drawbacks of these hydraulic automatic transmissions by providing a control system that includes a reverse lock-out, neutral idle and inching mode functionality.

In one example, a vehicle electronic automatic transmission has a plurality of electronic solenoids. The plurality of electronic solenoids control a flow of hydraulic fluid, which in turn actuates the operation of the transmission in both forward and reverse gears. An electronic control panel is operatively connected to at least one of the electronic solenoids. The electronic control panel includes a manual switch that actuates the flow of incremental, preset amounts of the hydraulic fluid. The electronic control panel is adapted to be remote from a driver seat of the vehicle. The incremental, preset amounts of hydraulic fluid correspond to predetermined distances of movement of the vehicle. The preset amounts of hydraulic fluid corresponding to incremental movement may correspond to movement of the vehicle about 20 centimeters, or alternatively about 5 to 40 centimeters, or still further alternatively about 10 to 30 centimeters. The movement of the vehicle may be in the forward or reverse direction. The fluid has a predetermined rate of flow to control the speed of moving the predetermined distances. The electronic control panel may be wirelessly connected to one of the electronic solenoids or, alternatively, operatively connected to a plurality of the electronic solenoids. The electronic control panel may be a personal, mobile smartphone. The electronic control panel may be mounted onto a fixed position at the rear of the vehicle. The vehicle may comprise a plug that is operatively connected to the solenoids, and the electronic control panel comprises a cable and connector that is adapted to be releasably inserted into the plug. The plug may be located at the rear or the front of the vehicle.

In another example, a vehicle electronic automatic, modified four-speed transmission is controlled by two shift solenoids driving the hydraulic actuation therein, and is also controlled by a shift lever in the vehicle. Two electric solenoids, a first electric controller operatively connected to those solenoids and the shift lever, and additional valving modifications are incorporated in the conventional four-speed transmission and form a modified four-speed transmission. The modified four-speed transmission forward, neutral and reverse positions are actuated by the shift lever. The first electric controller and the shift lever interact to activate the transmission into the forward, neutral and reverse positions, wherein the first electric controller is operatively connected to the two electric solenoids. The first electric controller prevents engagement of the forward and reverse positions in the modified four-speed transmission when vehicle parameters are not compliant with a predetermined safe operation of the transmission. The vehicle parameters that are not compliant include the vehicle speed being zero before shifting, the vehicle throttle position greater than 15%, and the transmission operation at an RPM greater than 1500.

DETAILED DESCRIPTION

An enhanced automatic transmission control is described herein that improves the operation and efficiency of operation of a transmission. Specifically, the enhanced electronic automatic transmission control enables a true neutral idle. It enables a reverse lock-out functionality. And it provides an inching mode of operation.

The specific class of transmissions described herein, after modification as explained, are electronic automatic transmissions. The unmodified transmissions are hydraulically actuated as controlled by a shift lever in the vehicle. Widely-known examples of these types of transmissions are the GM 4L60E and Ford 4R70 transmissions. These are four-speed transmissions that, prior to the present examples, were controlled by two shift solenoids driving the hydraulic actuation therein.

The improved functionality of the transmissions described herein is enabled by the incorporation of two electronic solenoids on the transmission together with additional valving modifications and an electric controller operatively connected to the manual valves and solenoids and the shift lever, and to the output shaft speed sensor of the transmission. The additional solenoid and valve modifications together with the electric controller enable the improved functionality as described in greater detail in the following.

Reverse Lock-out Functionality

Figure 1:
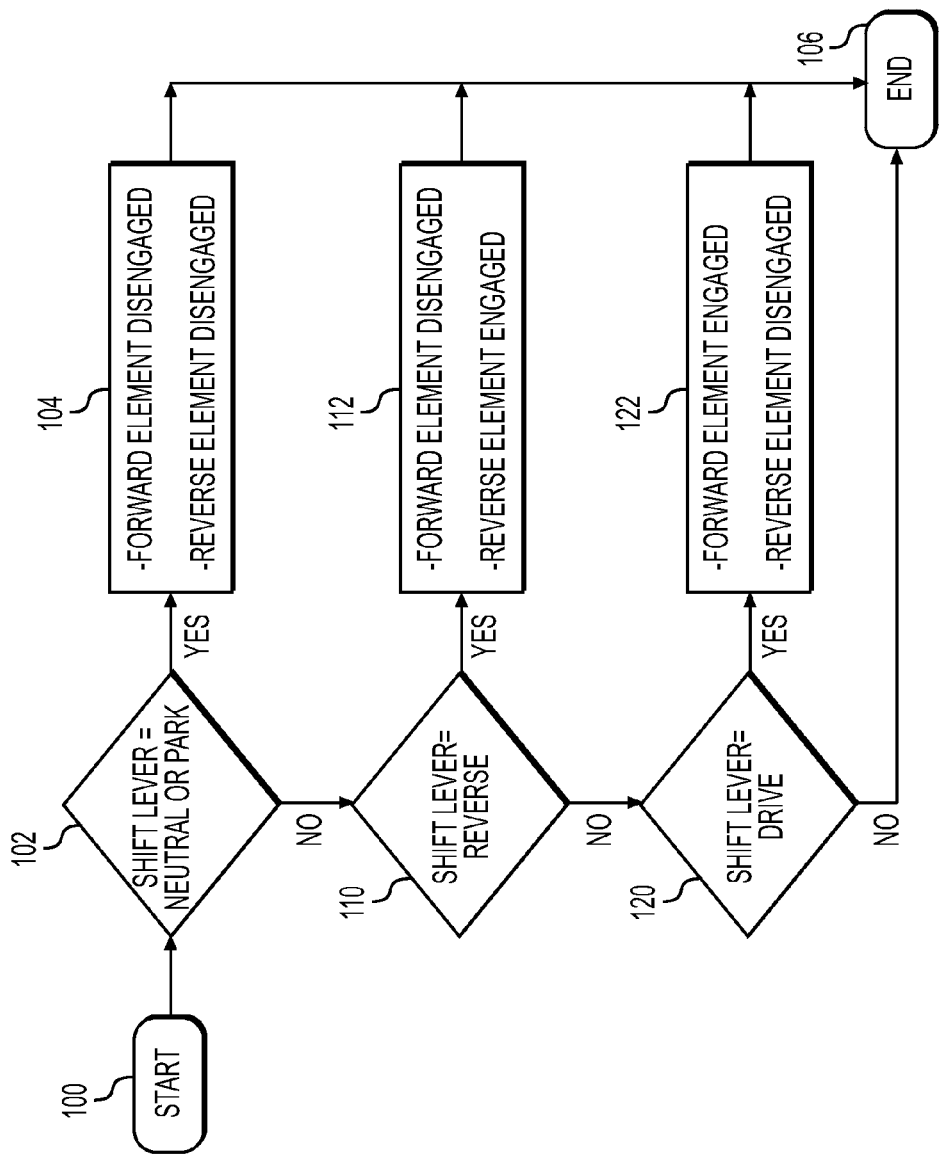
FIG. 1 is a functional flow chart of the operation of a standard automatic transmission having an electronic automatic system.
Figure 2:
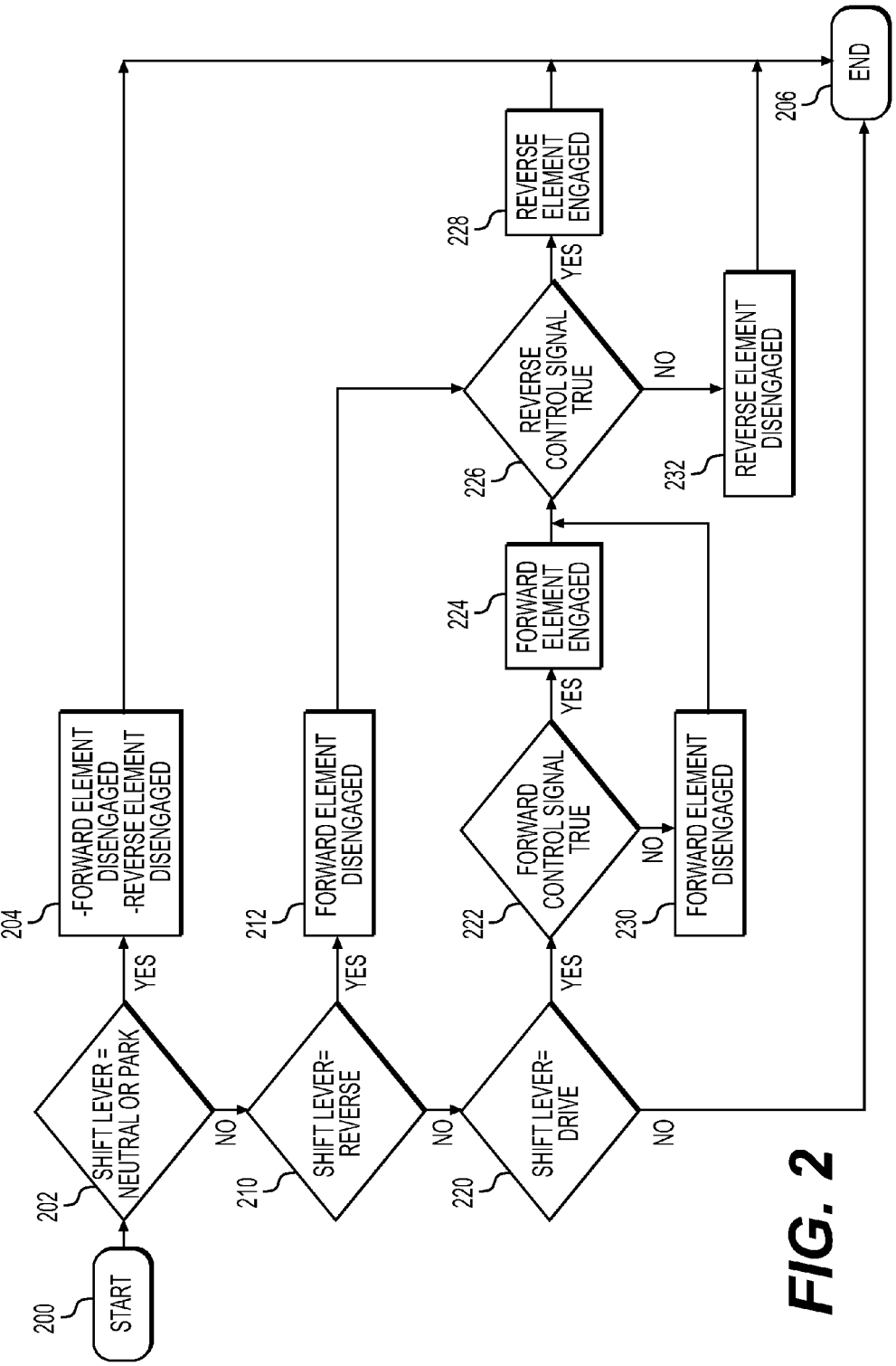
FIG. 2 is a functional flow chart describing the functionality of an electronic automatic transmission having a control system as described herein.

FIGS. 1 and 2 are functional flow charts of an automatic transmission. FIG. 1 demonstrates the operation of the automatic transmission in a conventional four-speed and two shift solenoid transmission based on a user's shifting of a lever in the vehicle. It is readily apparent from this flow chart that a user can simply shift into reverse whether from a neutral or park position or during the forward movement of the vehicle. (The same danger is possible when shifting into forward or park during reverse movement of the vehicle.) Such a shift directly from forward to reverse without first stopping or significantly slowing down a vehicle can cause catastrophic damage to the transmission. At the very least, some damage is caused by an inadvertent or careless shift directly from forward to reverse during forward motion.

Referring to FIG. 1, the conventional automatic transmission logic flow chart begins with the start 100 of an engine. The shift lever is in the neutral or park position 102. If the shift lever is in the neutral or park position, then both the forward element and reverse elements are disengaged as shown box 104. The logic flow chart then moves straight to the end function 106. After an engine is started 100, the shift lever may be placed in the reverse position 110. If the position in the reverse is confirmed as a yes, then the forward element is disengaged and the reverse element is engaged as shown in box 112. If the shift lever is placed in the drive position as shown in box 120, then the forward element is engaged and the reverse is disengaged as shown in box 122. As noted above, a shift directly from forward to reverse (or similarly reverse to forward) without first stopping or significantly slowing down a vehicle is enabled by this functional logic flow chart and operation of a conventional automatic transmission.

FIG. 2 is a flow chart that describes the functionality of the enhanced electronic automatic transmission described herein. As demonstrated in FIG. 2, when the shift lever is in drive, the reverse element will not be engaged unless and until the vehicle is stopped or has a predetermined, low RPM or speed that would allow safe actuation of the reverse mode. This reverse lock-out functionality prevents the inadvertent damage that can be caused to the transmission by a shift from the forward drive mode directly into reverse while the vehicle is moving forward at a substantial speed.

Turning more specifically now to FIG. 2, there is shown the logic flow chart of a transmission having a reverse lock out and neutral idle functionality. Again, as above, this logic is actuated by an operator moving the shift lever to the various neutral, reverse and forward drive positions in connection with the electric controller connected to the shift lever, the solenoids and the engine RPMs. The engine is first started as shown in box 200. If the shift lever is in the neutral or parked position 202, then the forward element is disengaged and the reverse element is disengaged as shown by box 204. If a shift lever is placed in the reverse position, box 210, then the forward element is disengaged as shown in box 212. Additionally, however, a reverse control signal true is addressed, box 226. If the reverse control signal is true, then the reverse element is engaged 228. However, if the reverse control signal is not true, for instance if the vehicle speed is greater than zero, the engine throttle is greater than 15%, or the engine RPM is greater than 1500, then the reverse element is disengaged 232. Therefore, even though the operator shifts the lever into reverse, box 210, both the forward element is disengaged 212 and the reverse element is disengaged 232 if the reverse control signal is not true. This is an example of the reverse lock out functionality. In a generally similar logic, when the shift lever is moved into drive, box 220, then a forward control signal true, box 222, confirmation is addressed. If the forward control signal is not true, then the forward element is disengaged, box 230. If the forward control signal is true, then the forward element is engaged, box 224. Even with this shift lever in the drive position, box 220, the reverse control signal true box 226 is addressed to make sure that the vehicle is not in reverse when shifted into drive.

Neutral Idle

Referring again to FIGS. 1 and 2, it is readily apparent from FIG. 1 that when a vehicle is shifted into reverse or drive, there is no neutral position when the car is idling or sitting still. This causes continued work by the vehicle on the transmission and, consequently, causes additional fuel to be spent during the operation of the vehicle during a stop, especially when that vehicle has frequent stops. As demonstrated in FIG. 2, however, the reverse element and/or forward element are not engaged until the reverse or forward control signal is determined to be "true." In other words, depending on the factors that are selected for the logic definition of true forward and true reverse, the transmission will not be actuated and will remain in neutral idle when the vehicle is stationary or otherwise qualifies under the true signal predetermined functionality.

The forward control signal function 222 and reverse control signal function 226 will be true, as an example, when the brake pedal is pressed, the throttle is at 0%, and vehicle speed is zero. Other signal functions may be chosen, and additional ranges of functions may be incorporated in the controller functionality. For instance, the throttle may optionally be 15% or less, or alternatively 10% or less. The vehicle speed may be 5 mph or less, or alternatively 3 mph or less.

Inching Mode Functionality

The electronic automatic transmission of the present invention has substantial utility in various industrial applications. In one example, the enhanced electronic automatic transmission will be used with the tractor vehicles used at airports to move baggage carts and position aircraft equipment and otherwise fulfill aircraft service and maintenance needs. As is known, these airport service vehicles will benefit significantly from the neutral idle and reverse/forward lock-out functionality already described herein. Additionally, because these service vehicles are constantly being hitched and unhitched to various trailers and other equipment, there is a need for the driver of the vehicle to constantly get in and out of the vehicle to hook-up and unhook that equipment.

For example, a vehicle driver may need to connect the service vehicle to a luggage trailer or trailers. The trailer hitch is located at the rear of the vehicle. The driver is sitting in the driver seat toward the front or front-middle of the vehicle. It may be necessary for the driver to put the vehicle in park and get out and visually observe where the hitch is in relation to the trailer one or several times before the vehicle is able to reasonably be connected to the trailer. Alternatively, a second individual is needed to visually guide the driver back to a position where the service vehicle is able to be hooked-up to a trailer.

In the inching mode enabled by the enhanced electronic automatic transmission described herein, a driver is able to leave the driver seat of the vehicle and himself or herself move the vehicle backwards or forwards in small increments to be able to accurately line up a hitch with a trailer while being outside of the driver seat of the vehicle. This inching mode is a function where the transmission is engaged in forward or reverse in very low gear and at very low speed for no more than predetermined, short increments. In one example, the inching mode allows the service vehicle to go forward or reverse in only 20 centimeter increments before it is stopped and requires a new or additional actuation. In this way, the service vehicle driver can leave the driver seat, go behind the vehicle, and using a control panel either at the back of the vehicle or otherwise remote from the driver seat, inch the vehicle back until the hitch is engaged with a trailer.

The short increments that define this inching mode may be any increment that is useful for a given functional application. In the example of an airport service vehicle, the increments may be five to forty centimeters, or alternatively 10 to 30 centimeters, or as already noted for example, about 20 centimeters. The operator deploying the inching mode may have additional distances for the inching mode that may be varied at the time the inching mode is initiated. For instance, the operator may visually determine that an inching increment of ten centimeters is called for. The operator can input ten centimeters in the control panel interface and the vehicle will move in reverse (or forward) ten centimeters. In one example, the inching mode is used in the increments only. In other words, once an increment is activated, then the vehicle will only move the set distance that is programmed or summoned. An operator will not be able to, for instance, hold a button down on the control panel to keep the vehicle moving. Alternatively, there could be a manual button on the control panel that enables continuous movement while the actuation button remains pressed. For safety purposes, it is believed that the incremental actuation only is best to prevent any accidental creeping.

It is already noted here that the incremental movement in this inching mode would be relatively slow. The control panel, in conjunction with the transmission electric controller, may be programmed to move the vehicle these incremental distances at a predetermined speed. The speed of the vehicle during inching is determined by the engine RPM, transmission gear ratio, final drive ratio, and tire size. For example, the valves may actuate forward motion (or reverse motion) at a rate of about 20 to 100 centimeters per second, or alternatively 40 to 80 centimeters per second, or still further alternatively, about 50 to 60 centimeters per second. In another example, it may be possible for an operator to vary the speed faster or slower by changing the inching mode engine RPM or inching gear. For safety reasons, the variability in the speed of reverse or forward motion will likely be limited. Also for safety purposes, the control panel will include an automatic stop function which will immediately stop the movement of the vehicle. The distance described herein is controlled by the amount of hydraulic fluid that is flowing from the actuated electronic solenoid valves of the modified transmission. Accordingly, the apply rate of the clutch (apply smoothness) is controlled by the amount of fluid and the rate of supply of the hydraulic fluid from the solenoid valves through the hydraulic transmission actuators.

The actual control panel that initiates and drives this inching mode can be engineered into a fixed position at the rear of the vehicle (or front of the vehicle for a front attachment). Alternatively, the control panel can be attached by a physical cable to the service vehicle but nevertheless allow the driver to be able to move and guide the vehicle forward or back when outside of the driver seat. Finally, the control panel could be a wireless device that allows the driver to inch the vehicle forward or in reverse in predetermined increments by using a wireless remote controller.

The speed of the inching mode and the limiting increments of the inching mode may be varied at the particular design and need of an operator. Additionally, any time a vehicle is being moved when there is no person sitting in the driver seat, there must be safety features, preferably redundant safety features, that prevent a vehicle from rolling off in either the reverse or forward direction. In the present enhanced electronic automatic transmission, the fluid flow to the transmission to guide the vehicle forward or backward is metered by the electronic solenoid under the direction of the electric controller so that the flow rate of hydraulic and the amount of hydraulic fluid are carefully limited.

Figure 8:
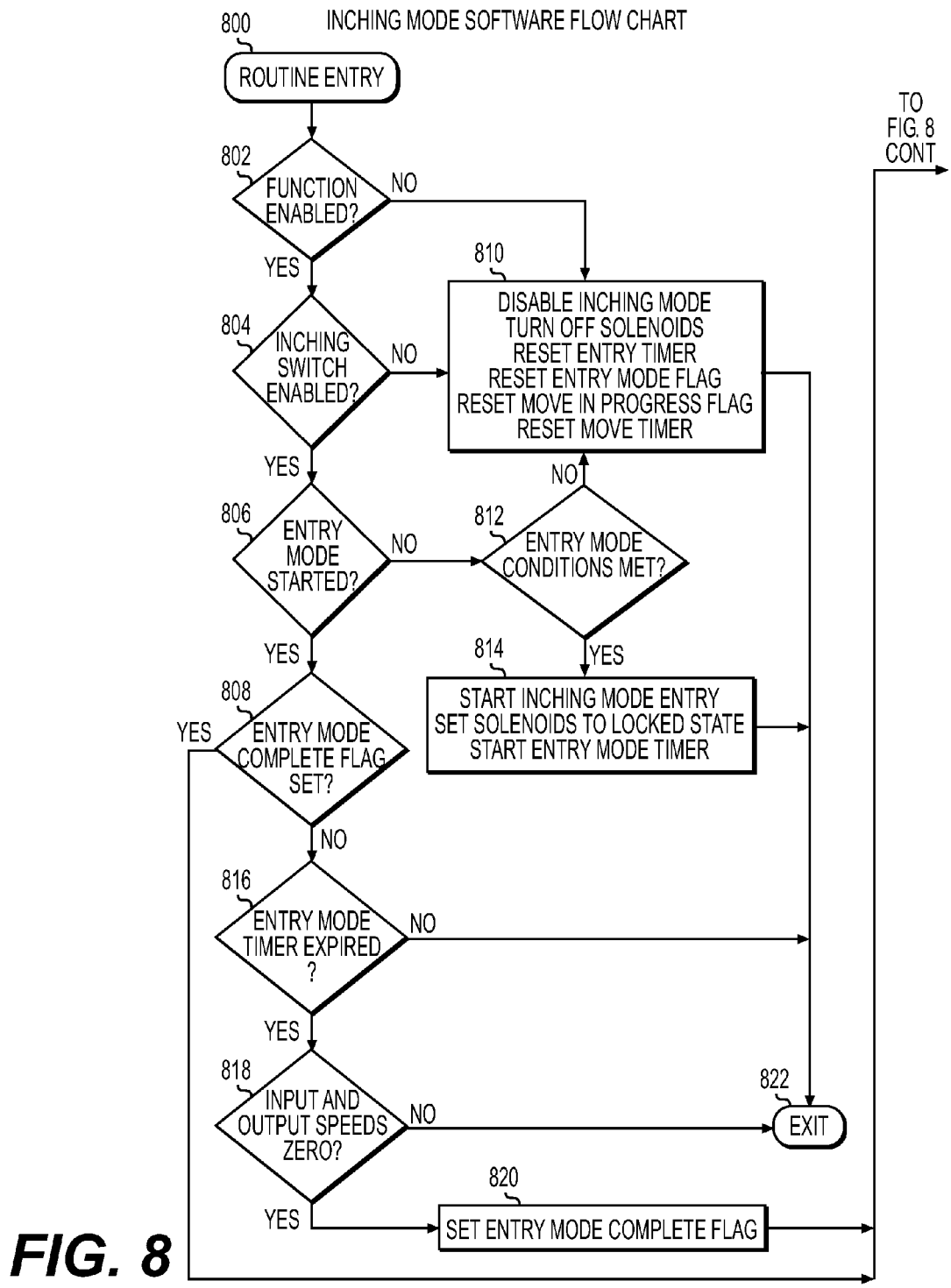
FIG. 8 is a functional software flow chart of the operation of the inching mode of the transmission.
Figure 8:
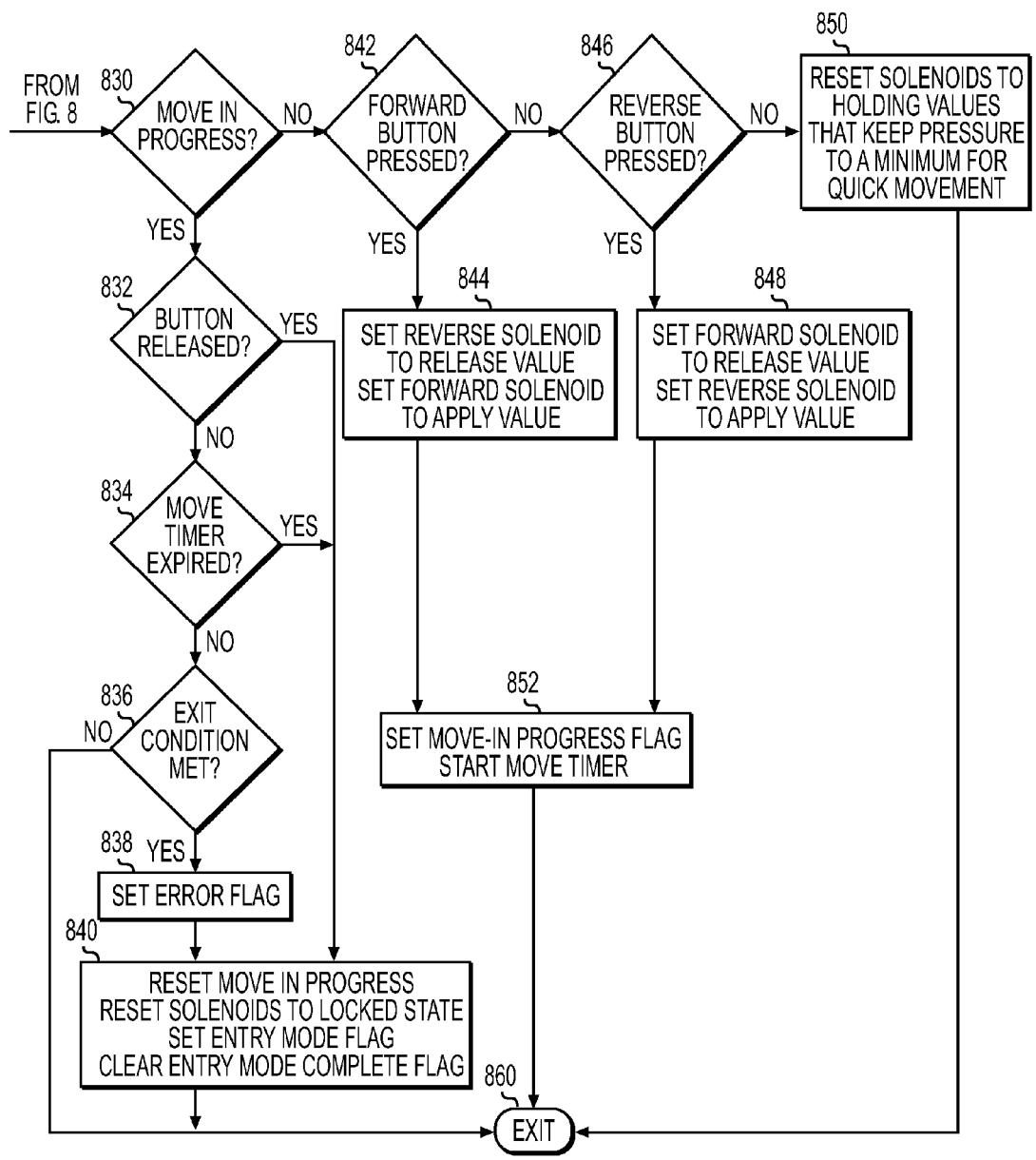

A flow chart of the logic functionality of the inching mode is attached as FIG. 8. The additional solenoids enable and enhance the operation of the transmission so that this inching mode is possible. The flow chart of the software indicates the safety features that are programed into the inching mode operation.

Turning to FIG. 8, there is shown the inching mode software flow chart that would be installed in the operator control panel, in conjunction with the transmission electric controller, of the vehicle when in the inching mode. At the outset, the inching mode is actuated, box 100. The first question addressed is whether the function is enabled 802. If not, then the inching mode is disabled and all actions are turned off or reset as shown in box 810. If the function is enabled, box 802, then the inching switch is addressed, box 804. If the inching switch is not enabled, then there is an immediate disablement and power off and reset as shown in box 810. If the inching switch is enabled, box 804, then the entry mode is started, box 806. If the entry mode is not started, then the logic addresses entry mode conditions 812. If those entry mode conditions are not met, then the inching mode is disabled, the solenoid is turned off and the timer is reset as shown in box 810. If the entry mode conditions are met, box 812, then the logic moves forward to start the inching mode entry including the entry mode timer as shown in box 814. If the entry mode is started, box 806, then the entry mode complete flag set question is addressed, box 808. If the entry mode complete flag is not set, then the question is addressed whether the entry mode timer has expired, box 816. If so, then the input and output speeds are addressed to determine whether they are zero, box 818. If not, then the software exits, box 822. If they are, then the entry mode complete flag, box 820, is set and moves the process forward. The next functionality is an address of the move in progress, box 830. If that question is answered with a no, then the question whether a forward button is pressed is addressed, box 842. If not, then there is the question of whether a reverse button is pressed, box 846. If not, the solenoids are reset to hold the values that keep pressure to a minimum for quick movement, box 850. If the forward button is pressed, box 842, then the reverse solenoid is released and the forward solenoid has the hydraulic applied to it, box 844. This will allow the move in progress flag to be set with also the start of a move timer, box 852. Similarly, if the reverse button is pressed, box 846, then the forward solenoid is released and the reverse solenoid is applied, box 848. This sets the move in progress flag and starts the move timer, box 852. Returning to the move in progress box 830 functionality, if the move in progress is acknowledged, then the question of whether button is released is shown in box 832. If yes, then the reset move in progress and the reset of the solenoids to the lock state; if not, then the logic addresses the move time expiration, box 834. If yes, then the reset functionality is actuated in box 840. If not, then the next step questions whether the exit condition has been met, box 836. If not, then the exit of the software. If it has, then the error is set, box 838.

Turning now to FIGS. 3-7, there is shown the specific valve flow operation of the enhanced electronic automatic transmission described herein.

Figure 3:
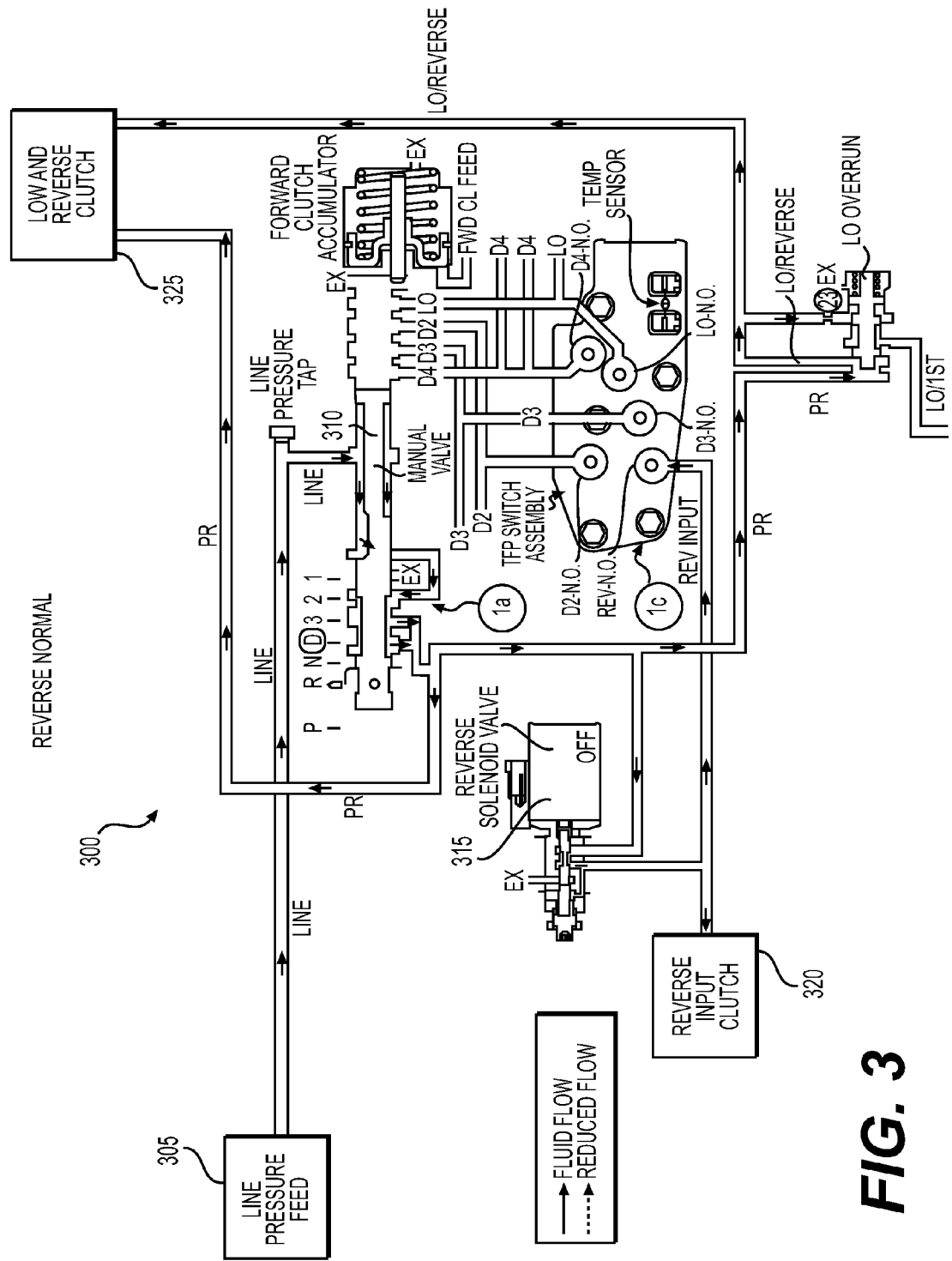
FIG. 3 is a graphic illustrating the hydraulic flow of reverse normal operation.
Figure 4:
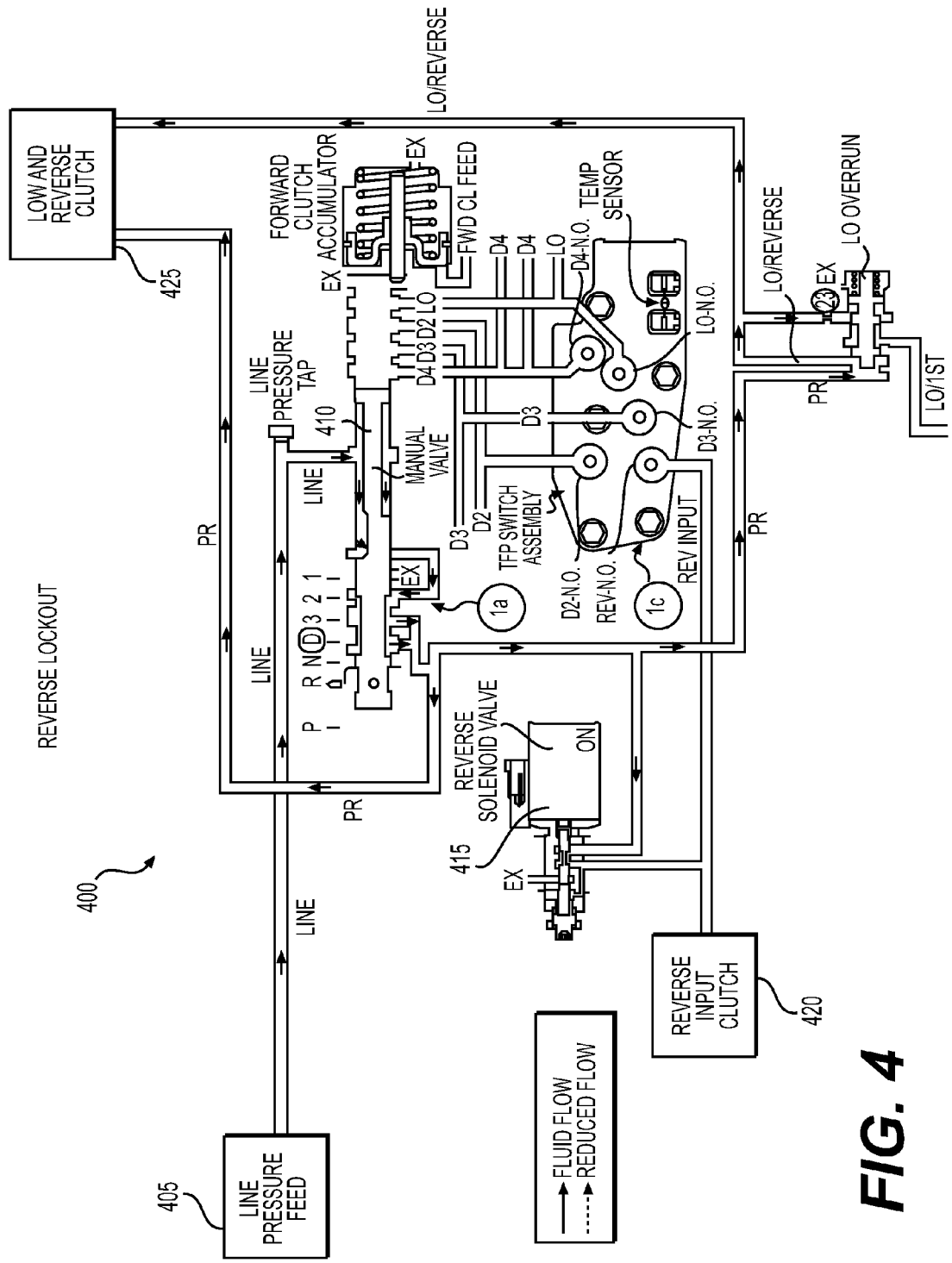
FIG. 4 is a graphic illustrating the hydraulic flow of a reverse lockout operation.

FIGS. 3 and 4—Reverse Normal and Reverse Lockout Functionality

Reverse Normal (300)

Transmission hydraulic pressure, called line pressure, is generated by the transmission hydraulic pump 305 driven by the engine. Line pressure is fed into the manual valve 310. The transmission shift lever is mechanically attached to the manual valve. In this example, the shift lever is in the Reverse position thus the manual valve 310 is feeding the reverse hydraulic circuits. For the vehicle to move in reverse, hydraulic pressure must be applied to both the reverse input clutch 320 and the low and reverse clutch 325. Hydraulic pressure is fed, uninterrupted from the manual valve 310 to the low and reverse clutch 325. Instead of feeding the reverse input clutch 320 directly, the hydraulic fluid is routed through a solenoid 315. In this implementation, this solenoid provides a connection between the manual valve 310 and the reverse input clutch 320 when the solenoid 315 is off. With the solenoid in the off position, reverse operation operates normally. When the driver shifts the lever into reverse, the transmission will shift into reverse.

Reverse Lockout (400)

The reverse lockout operation is based on the same principle as described for FIG. 3. The manual valve 410 is placed in the reverse position by the vehicle operator by shifting into reverse. However, to achieve the lockout functionality, hydraulic fluid is blocked by the energized solenoid 415 and no hydraulic pressure is applied to the reverse input clutch 420. With no pressure at the reverse input clutch 420, the transmission does not engage reverse and the vehicle is in a neutral state.

Figure 5:
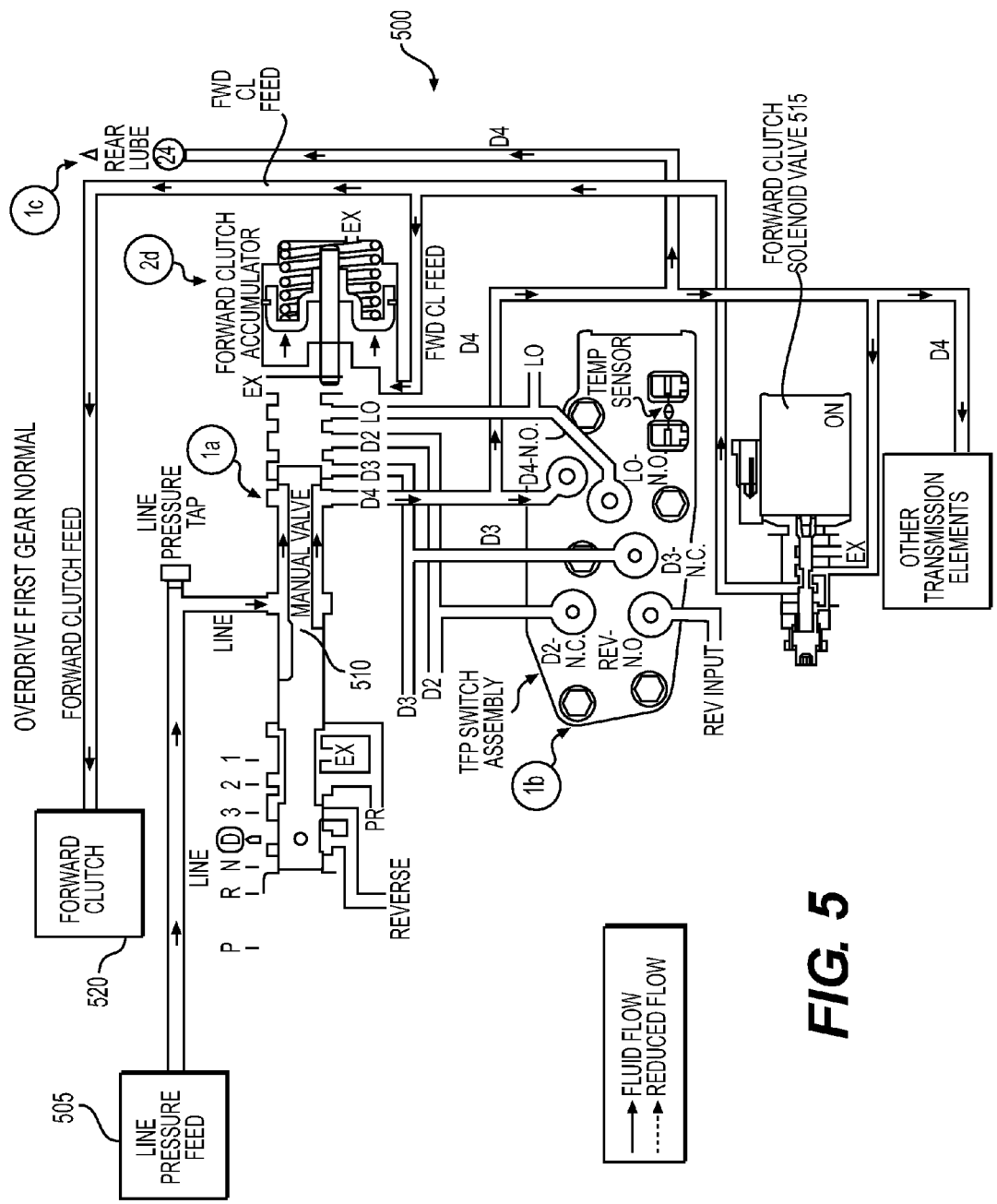
FIG. 5 is a graphic illustrating the hydraulic flow of an overdrive first gear normal operation.
Figure 6:
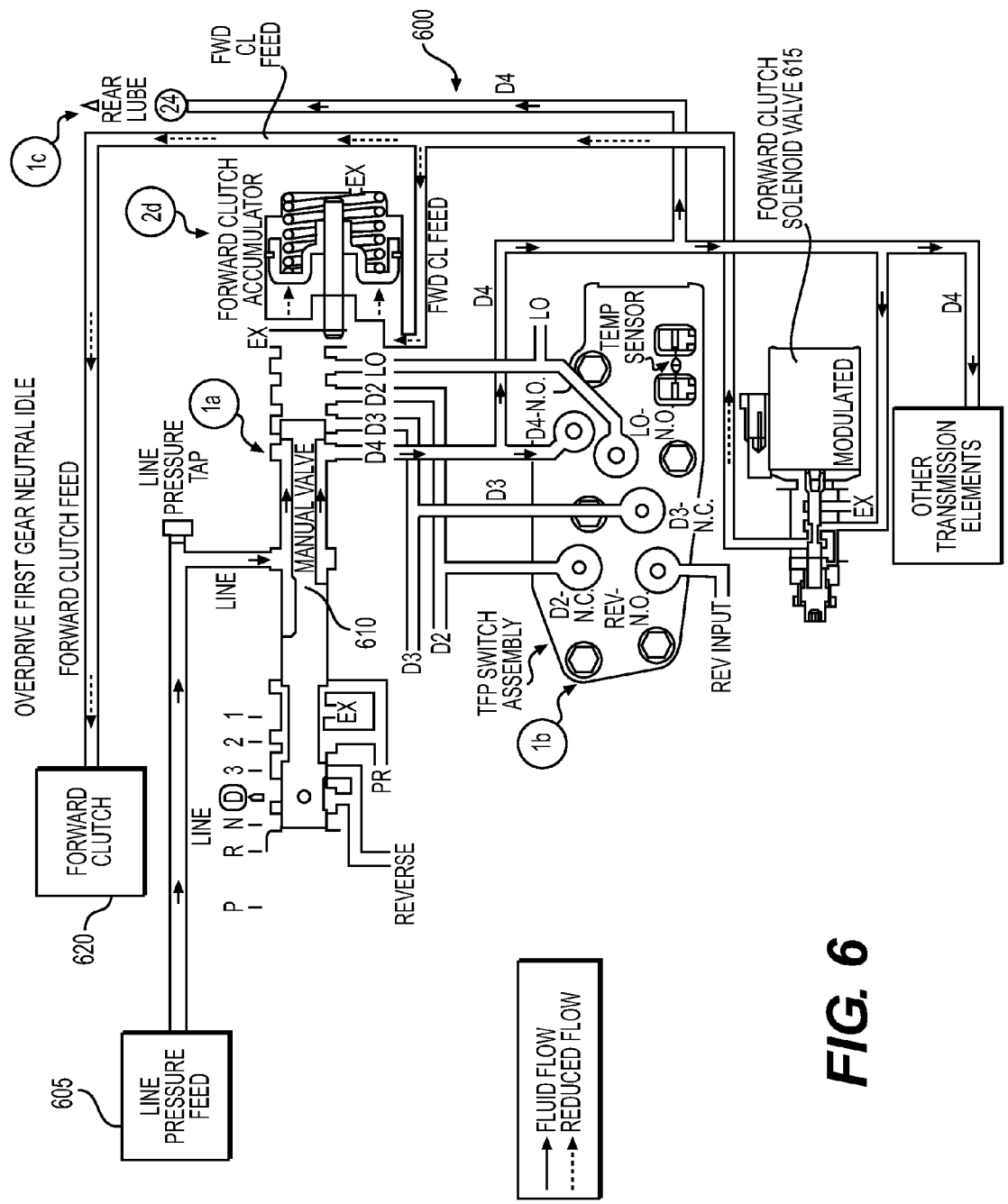
FIG. 6 is a graphic illustrating the hydraulic flow of an overdrive first gear neutral idle operation.
Figure 7:
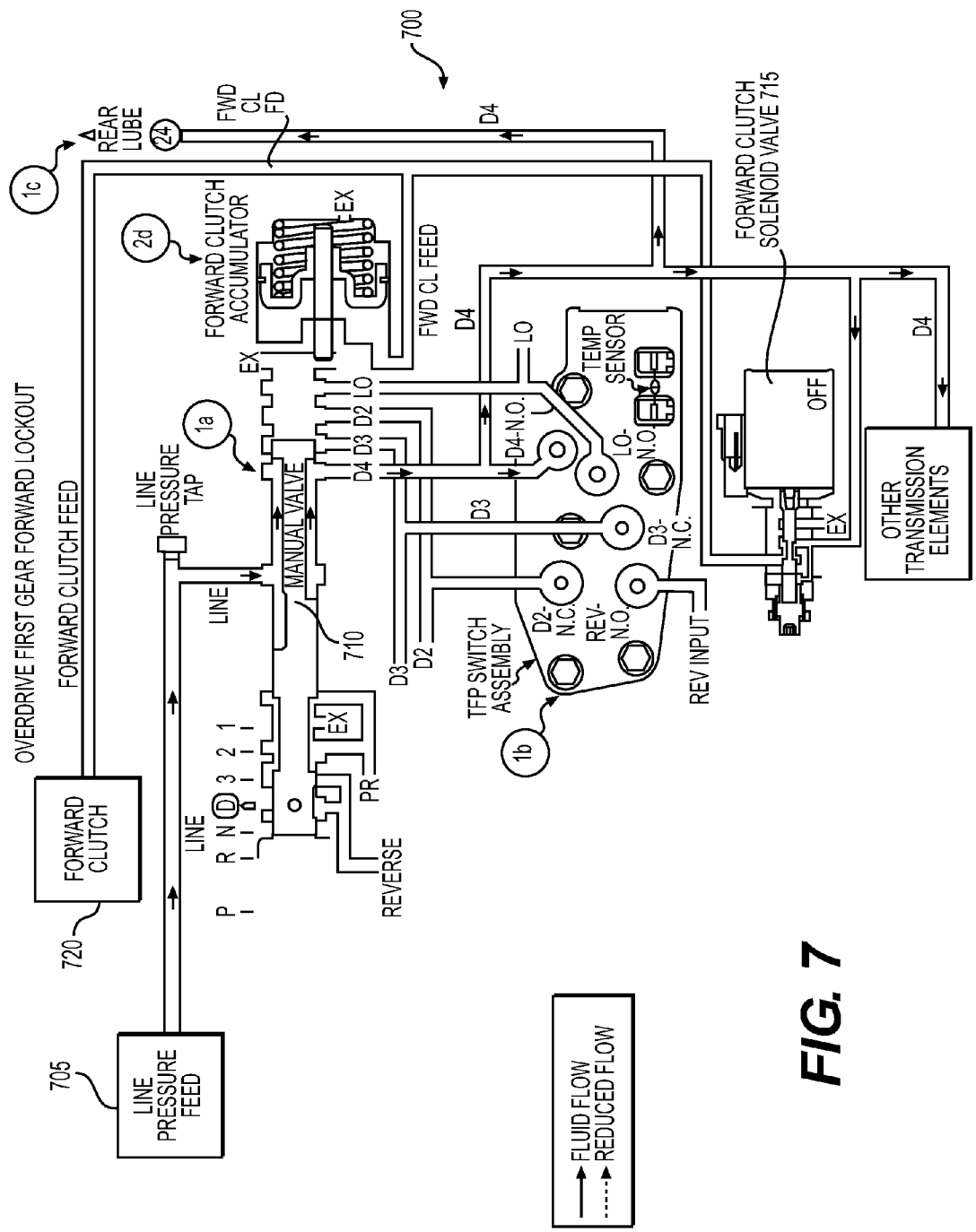
FIG. 7 is a graphic illustrating the hydraulic flow of overdrive first gear forward lockout operation.

FIGS. 5-7—Overdrive First Gear Normal, Neutral Idle and Forward Lockout

Overdrive First Gear Normal (500)

Transmission hydraulic pressure, called line pressure, is generated by the transmission hydraulic pump 505 driven by the engine. Line pressure is fed into the manual valve 510. The transmission shift lever is mechanically attached to the manual valve. In this example, the shift lever is in the Drive position thus the manual valve 510 is feeding the drive hydraulic circuit. For the vehicle to move in drive, hydraulic pressure must be applied to the forward clutch 520. Instead of feeding the forward clutch 520 directly, the hydraulic fluid is routed through a solenoid 515. In this implementation, this solenoid provides a connection between the manual valve 510 and the forward clutch 520 when the solenoid 515 is energized. With the solenoid in the on position, drive operation operates normally. When the driver shifts the lever into drive, the transmission will shift into drive.

Overdrive First Gear Neutral Idle (600)

Hydraulic pressure generated by the transmission hydraulic pump is fed into the manual valve 610. The transmission shift lever is mechanically attached to the manual valve. In this example, the shift lever is in the Drive position thus the manual valve 610 is feeding the drive hydraulic circuit. For the vehicle to move in drive, hydraulic pressure must be applied to the forward clutch 620. Instead of feeding the forward clutch 620 directly, the hydraulic fluid is routed through a solenoid 615. When the driver depresses the throttle, the solenoid 615 is energized, hydraulic fluid is applied to the forward clutch 620 and the vehicle moves forward. When the driver releases the throttle and depresses the brake pedal, the solenoid 615 is modulated. The solenoid 615 is modulated to generate a pressure which is low enough to not engage the forward clutch 620 thus reducing the engaged elements, reducing the power consumed by the transmission, and reducing the fuel consumption of the engine. The solenoid 615 is not completely turned off because there may be a noticeable time delay upon re-engagement when the driver applies the throttle. Instead, the solenoid is modulated to keep a small amount of hydraulic pressure in the forward clutch circuit to reduce any lag in reapplying the forward clutch 620.

Overdrive First Gear Forward Lockout (700)

Transmission hydraulic pressure, called line pressure, is generated by the transmission hydraulic pump 705 driven by the engine. Line pressure is fed into the manual valve 710. The transmission shift lever is mechanically attached to the manual valve. In this example, the shift lever is in the Drive position thus the manual valve 710 is feeding the drive hydraulic circuit. For the vehicle to move in drive, hydraulic pressure must be applied to the forward clutch 720. Instead of feeding the forward clutch 720 directly, the hydraulic fluid is routed through a solenoid 715. In this implementation, this solenoid 715 is turned off and the hydraulic fluid is blocked from the forward clutch 720. With no hydraulic pressure at the forward clutch 720, the transmission is in a neutral state.

Other embodiments of the present invention will be apparent to those skilled in the art from consideration of the specification. It is intended that the specification and Figures be considered as exemplary only, with a true scope and spirit of the invention being indicated by the following claims.

That which is claimed is:

1. An electronic automatic four-speed transmission for a vehicle, the transmission comprising:
   an electronic automatic four-speed transmission;
   the transmission controlled by a shift lever in the vehicle and also by hydraulic valves driving the hydraulic actuation of the transmission;
   two electric solenoids operatively connected to the hydraulic valves, wherein the solenoids are adapted to control the forward and reverse positions of the hydraulic valves;
   a first electric controller operatively connected to the shift lever and to the two electric solenoids;
   further wherein the first electric controller and the shift lever interact together to activate the transmission into the forward, neutral and reverse positions; and wherein the first electric controller overrides a shift lever selection of forward and reverse operation of the transmission and electronically prevents, through control of the electric solenoids, the actuation of the forward and reverse positions of the hydraulic valves in the transmission when vehicle parameters measured by the first electric controller are not compliant with a predetermined safe operation of the transmission.

2. The electronic automatic four-speed transmission for the vehicle as described in claim 1,
wherein the vehicle parameters measured by the first electric controller include a vehicle speed, and the vehicle parameters are not compliant with the vehicle speed being zero before shifting.

3. The electronic automatic four-speed transmission for the vehicle as described in claim 1,
wherein the vehicle parameters measured by the first electric controller include a vehicle throttle position, and the vehicle parameters are not compliant with a vehicle throttle position greater than 15%.

4. The electronic automatic four-speed transmission for the vehicle as described in claim 1,
wherein the vehicle parameters measured by the first electric controller include an engine RPM gauge, and the vehicle parameters are not compliant when an engine associated with the transmission is operating at an RPM greater than 1500.

5. The electronic automatic four-speed transmission for the vehicle as described in claim 1,
wherein the vehicle parameters measured by the first electric controller include a vehicle speed, and the vehicle parameters are not compliant with the vehicle speed being 5 mph or less before shifting.

6. The electronic automatic four-speed transmission for the vehicle as described in claim 1,
wherein the vehicle parameters measured by the first electric controller include a vehicle speed, and the vehicle parameters are not compliant with the vehicle speed being 3 mph or less before shifting.

7. The electronic automatic four-speed transmission for the vehicle as described in claim 1,
wherein the vehicle parameters measured by the first electric controller include a vehicle throttle position, and the vehicle parameters are not compliant with a vehicle throttle position greater than 10%.

8. The electronic automatic four-speed transmission for the vehicle as described in claim 1,
wherein the vehicle parameters measured by the first electric controller include a vehicle throttle position, and the vehicle parameters are not compliant with a vehicle throttle position greater than 0%.

* * * * *